Sept. 26, 1967 R. B. DICKSON 3,344,008

METHOD OF FORMING NAIL CLIP

Original Filed Nov. 5, 1963 2 Sheets-Sheet 1

INVENTOR.
ROBERT B. DICKSON
ATT'Y.

Sept. 26, 1967 R. B. DICKSON 3,344,008
METHOD OF FORMING NAIL CLIP
Original Filed Nov. 5, 1963 2 Sheets-Sheet 2

INVENTOR.
ROBERT B. DICKSON
BY
ATT'Y.

United States Patent Office 3,344,008
Patented Sept. 26, 1967

3,344,008
METHOD OF FORMING NAIL CLIP
Robert B. Dickson, Evanston, Ill., assignor to Dickson Weatherproof Nail Company, Evanston, Ill., a corporation of Delaware
Original application Nov. 5, 1963, Ser. No. 321,450, now Patent No. 3,212,633, dated Oct. 19, 1965. Divided and this application May 28, 1965, Ser. No. 459,558
7 Claims. (Cl. 156—296)

The present invention is a division of application Serial No. 321,450, filed November 5, 1963, now Patent No. 3,212,633 and relates to power driven nailing equipment and to the handling of nails, particularly common nails, both loose and in clips for feeding the nails to an automatic hammer.

Power equipped devices have been used for many years for driving nails and brads. Many problems have beset the industry requiring the provision of special nails and magazines inclined to the driving barrel. Expensive strips, wire, webbing or adhesive tapes have been restored to in order to space the nail shanks and maintain the nail heads in coplanar relationship for straight line feed applications.

An object of the invention resides in handling common nails having single, double or cabinet heads in clips of ten nails which are compactly shipped and easily managed for a gun taking up to fifty nails at one loading, yet the gun can be quickly loaded fully or in part with any common or headed nail one at a time if desired or necessary.

A further object of the invention is to provide a simple, power driven nailer of the repeating type embodying a novel magazine which is easily loaded with clips of nails or independent nails individually or in groups, with the magazine either readily replaceable, or quickly rechargeable without removal.

A further object of the invention is to provide a resting status for a power nailer which prevents movement of the next nail from the magazine into the driving chamber until after actuation of the device whereupon release is immediately accomplished followed instantly by the first of a series of nail driving hammer blows with continuous contact being maintained between the nail and the driving element struck by the hammer.

Another object resides in providing a magazine construction which handles all common nails as well as many special nails in a lineal space no longer than the sum total of the nail shank diameters loaded in the magazine.

A further object of the invention resides in maintaining the shank portions of common nails in contact with one another in a magazine whereby nail feed movement to a driving element may be accomplished by forces applied remotely from the driving element as at the entry end of the magazine.

Further objects of the invention will appear from the description which follows and the drawings related thereto in which.

Figure 1:
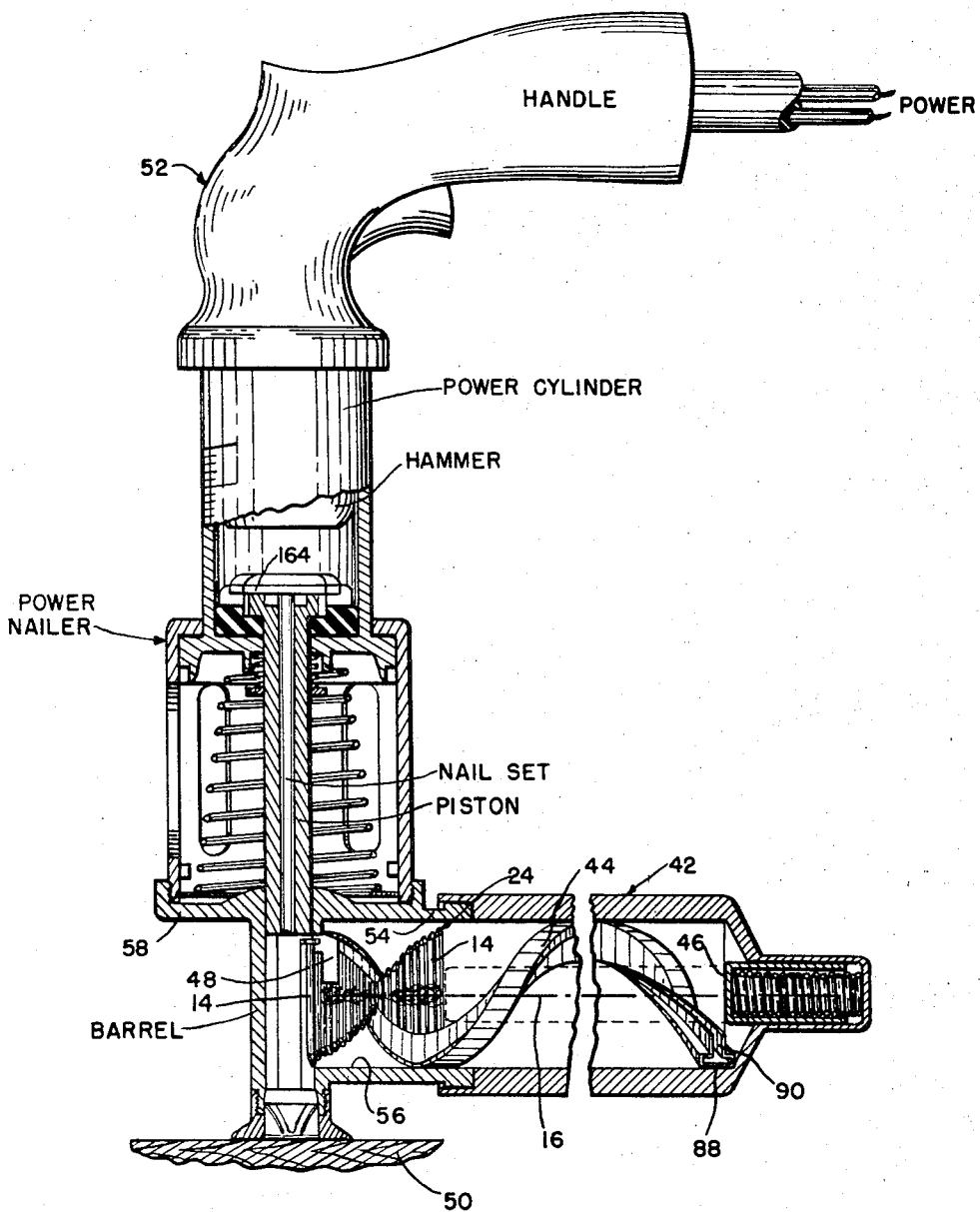
FIG. 1 is a side elevational view partly in section taken longitudinally and centrally through a portable power nailer embodying the invention.

The invention is illustrated in connection with the nails that are most used. Such is the common nail that ranges from 1.5 to 2.5 inches in length and the nail 10 particularly disclosed is an eightpenny common nail approximately 2.5 inches long with a wire shank diameter of .13 inch and head diameter of .28 inch. For ready handling the nails are arranged in clips 12 of ten nails each (FIG. 2) in which the shanks 14 contact a little off-center their midpoint in a straight line 16 sometimes referred to herein as an axis and the heads 18 contact edge-to-edge at their periphery in a helical path with their top surfaces 20 defining a cylindrical surface of revolution 22.

Although both contacting areas may be adhered with a frangible cement 30 (FIG. 3), it has been found that adherence at the center contacts of the nail shanks is adequate.

Figures 2, 3:
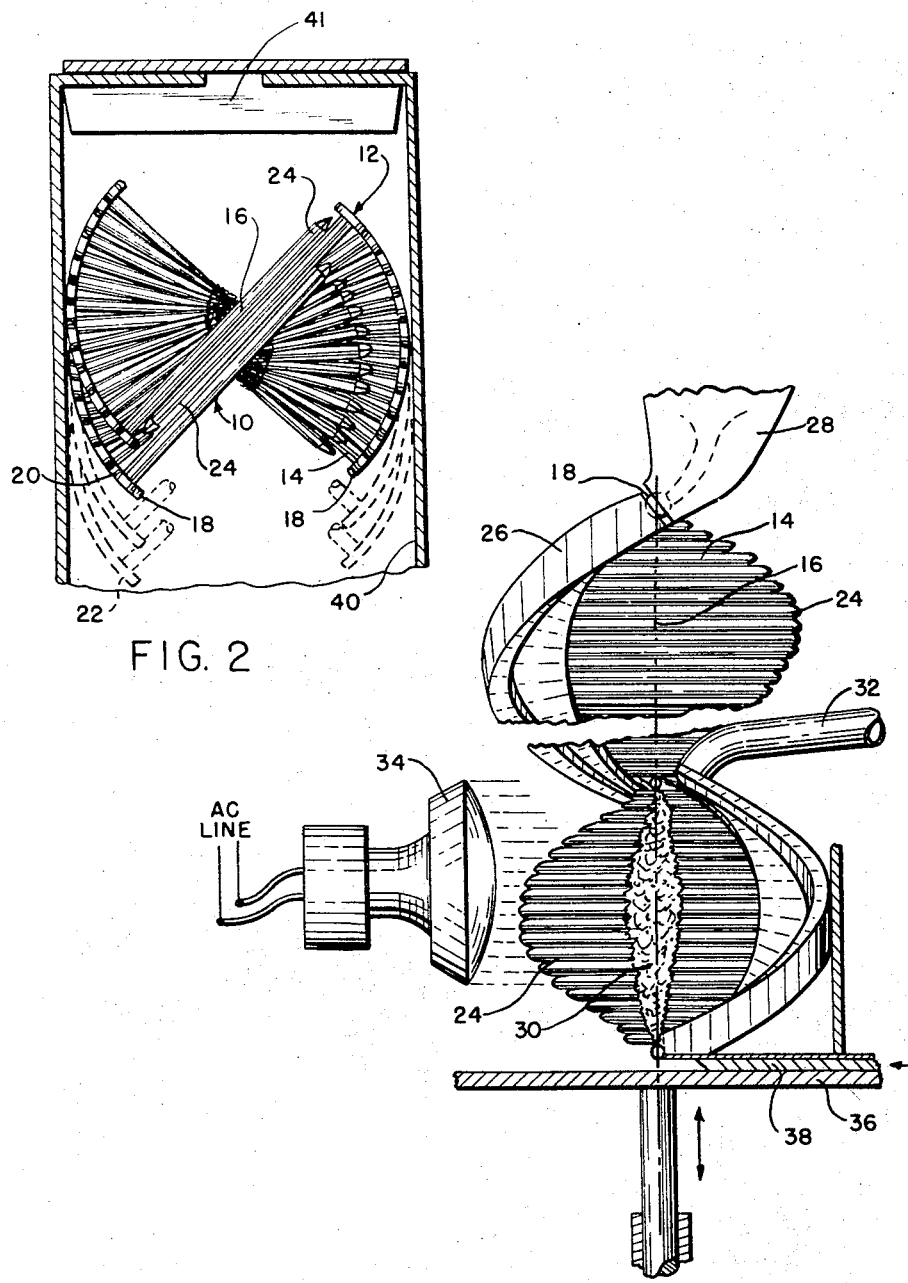
FIG. 2 is a top plan view partly in section of the nail clip form embodying the invention as packaged with the clips in nested relationship.
FIG. 3 is a side elevational view of an apparatus by which the nail clips embodying the invention are produced.

The helix angle is one of approximately 35° and although the clips may be formed to a full helical turn or any part of a full turn, it is preferred to furnish them in units of ten nails each. This provides a little less than a 90° turn as shown in FIG. 2. The heads are about twice the diameter of the shank. In this size and number they are easy to count, assemble, handle and package. The clips nest with each other and pack flat side by side with the center lines 16 spaced and parallel with each other (FIG. 2). Shorter nails down to 1.5 inch in length can be formed on the same helix but the shanks would contact nearer the point ends 24 of the nail, the heads 18 remaining in the same helical path.

In forming the clips a collector 26 (FIG. 3) defining a corresponding helical track is fed with oriented nails at the upper end from a hopper 28. The heads enter a T-slot or groove of the track along the helix angle mentioned, and in advancing to the bottom the helical configuration is imposed on them of several turns leaving the shanks 14 exposed laterally where they contact at the center line 16 of the helix. On their way down the center contacting portions of the shanks are provided with an adhesive 30 which is quickly dried with applied heat from an infra red lamp 34 to a brittel consistency. The lower end of the helix rests on an elevator 36 and a knife 38 cuts off the lower ten nails from the assembly as a unitary clip.

Two collectors preferably are employed together on a single loading line, or one is rotated 180° each cut, so that the clips interdigitate with heads alternately opposite as the clips nest laterally and move as package assemblies (FIG. 2) into rectangular packages 40 that are as wide as the nails are long, as thick as the axial height of the clips at the contacting nail heads, and as long as needed to accommodate ten, twenty or thirty nested clips 12 as desired. The alternate reversal of the head ends results in each clip head end portion being interdigitated or nested between the pointed ends of the nail clips adjacent thereto.

When received ready for use, the flap 41 of the package 40 is opened at the end and the nested clips are slid therefrom to be dropped one by one into a helical nail feeder magazine 42 (FIG. 1) having a helical feeder track 44 in which the nails are advanced by a follower 46 at the entry end to a working position 48 where the nails are severad one at a time and driven into a workpiece 50. With factory nailing machines the clips can be fed automatically. The package can be end opened and the clips dropped straight away one by one into a passageway in which the clips are oriented all ends alike for entrance into a helical feed magazine as a continuous helix of nails. The passageway catches the wider overall axial height of the clip at the head portion and turns each alternate clip into oriented position.

With portable power tools such as shown at 52 in FIG. 1, the clips can be hand inserted one or more at a time into the track 44 in magazine 42. The magazine will take at least four clips, preferably six to eight. Four clips will supply a magazine of 40 nails and six to seven inch magazine provides a starting charge of half a hundred nails plus any partially used clip already present.

Moreover, it will be appreciated from the description herein that loose common nails can also be fed into the magazine 42 if desired at any time as a group or intermingled between clips.

The helically shaped track 44 is similar to track 26 and peripherally supported in the tubular housing to receive nail clips 14 in helically aligned and guiding relationship. The plan contour of the nail 10 adjacent to and including the head 18 (FIG. 6) is approximated in the cross-sectional contour of the track and preferably is defined by an elongated element having a T-groove 86 therein, the element preferably is rolled from straight stock like a helical spring into a helix in which the head portion 88 of the groove defines a helical lead angle of approximately 35° and the space between the legs 90 of the T-groove define a helix angle of 45° or more, leaving approximately one-third to one-half of the length of the nail shank 14 exposed at the center of the tubular housing 54. If a 2.5 inch nail is fed, a third of the center portion of the shank will be exposed. If a 1.5 inch nail is fed, it will be the terminal portion of the shank that is exposed. If the nail heads 18 are twice the diameter or more of the shank 14, the head helix angle will be 35° or less accordingly. If the heads 18 are less than twice the diameter of the shank 14, a magazine and helix of 35° will still take the nails with the clip provided with a 35° helix angle.

The track can be formed in a continuous process with radially directed pairs of turning rollers and axially directed twisting rollers operating against a radially directed flange roller canted to the helix angle of the mouth of the track.

Although the track 44 can serve as an interchangeable assembly clip component, it preferably is secured to the inner wall 56 of the tubular member 54 and the outer mouth of the track 44 is shaped to only receive the heads of the nail clip. The feed follower 46 slides in and is guided on the inner edges of the track where the helix angle is 45° or more, thereby providing a favorable angle for advancing the nails with pressure at the clip areas 16. Other bracing elements (not shown) may be provided as needed to rigidify the assembly.

Thus, even if loose nails are employed, the nails are held in crossed relation at the axis 16 of the compartment 56 as guided by the side walls of the track and the angle of the helix which permits the nail heads to clear themselves in a spiral direction without any endwise movement of individual nails. Finishing nails in clip form can also be used because the adhesive as well as the fanned-out relationship of the head portions hold the nails in proper orientation.

It is highly desirable that the magazine be kept free from outside contamination and for this reason it is made completely sealed except for when loading.

While common nails are disclosed in the drawing and the description relating thereto it will be understood that any form of nail having a head diameter larger than the shank can be handled by devices embodying the invention, including spikes, roofing nails, brads, finishing nails, etc., and further that frangible bonds other than cement can be employed including plating material, soft wires fused thereon, or tapes, provided they hold the shanks in contact with each other where they cross.

Having thus disclosed and described the invention, it will be readily apparent how the stated objects and other objects and advantages set forth are accomplished and how various and further changes can be made therein without departing from the spirit of the invention, the scope of which is commensurate with the appended claims.

What is claimed is:

1. The method of forming a nail clip comprising fanning out a series of nails in coaxial helices in which the head ends define one helix and the nail points define the other helix with the nail shanks crossing in contact with each other at the axis of the helices, applying adhesive to the nail shanks along said axis, drying the adhesive to hold said nails in cohesive form and cutting said form into clip segments of a predetermined number of nails per clip.

2. The method called for in claim 1 in which the clip segments are less than an obtuse angle and said helix of the nail points being substantially smaller initially than the radius of said head and helix.

3. The method of forming a nail clip comprising fanning out a series of common nails with their heads in edge to edge contact and their shanks crossing in contact with each other intermediate their ends, applying adhesive to the nail shanks where they cross and drying the adhesive to hold said nails in frangible form where they cross in contact.

4. The method called for in claim 3 in which the clip has approximately ten nails in it defining less than an obtuse angle of a helix at their heads.

5. The method of forming a nail clip comprising inducing the heads of a series of nails to occupy a helical path with their heads in edge to edge contact and their shanks contacting at the axis of said helical path, applying cement adhesive to the nail shanks along said axis, and drying the adhesive to hold said nails in cohesive form.

6. The method called for in claim 5 in which the clip segments are assembled under gravity with their heads supported in a helical guide directing the shanks of the nails into crossing engagement with each other.

7. The method of forming a nail clip comprising guiding the heads of a series of common nails along a helical path in edge to edge contact and disposing the nail shanks in crossing contact with each other at the axis of the helix, and releasably holding the shanks of the nails in engagement with each other along said axis.

References Cited

UNITED STATES PATENTS

| | | | |
|---|---|---|---|
| 2,909,781 | 10/1959 | Ollig et al. | 206—56 |
| 3,165,868 | 1/1965 | McDonald et al. | 53—35 |
| 3,303,632 | 2/1967 | Halstead | 53—140 |

ROBERT C. RIORDON, *Primary Examiner.*

R. L. FARRIS, *Assistant Examiner.*